United States Patent
Watson et al.

(10) Patent No.: US 11,367,053 B2
(45) Date of Patent: Jun. 21, 2022

(54) SYSTEM AND METHOD FOR DAMAGE ASSESSMENT AND RESTORATION

(71) Applicant: University of Connecticut, Farmington, CT (US)

(72) Inventors: Peter L. Watson, Storrs, CT (US); Diego Cerrai, Willington, CT (US); Emmanouil Anagnostou, Mansfield Center, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 16/683,701

(22) Filed: Nov. 14, 2019

(65) Prior Publication Data
US 2020/0160283 A1    May 21, 2020

Related U.S. Application Data

(60) Provisional application No. 62/768,379, filed on Nov. 16, 2018.

(51) Int. Cl.
*G06Q 10/00* (2012.01)
*G01W 1/10* (2006.01)
(Continued)

(52) U.S. Cl.
CPC .............. *G06Q 10/20* (2013.01); *G01W 1/10* (2013.01); *G06F 9/5005* (2013.01); *G06F 16/29* (2019.01); *G06K 9/6256* (2013.01); *G06N 3/08* (2013.01)

(58) Field of Classification Search
None
See application file for complete search history.

(56) References Cited

U.S. PATENT DOCUMENTS 6,574,561 B2   6/2003  Alexander et al.
8,280,633 B1 * 10/2012  Eldering ............... G06Q 40/08
                                                      702/3
(Continued)

FOREIGN PATENT DOCUMENTS

EP    2472455 A1    7/2012
WO    2008133922 A1   11/2008
(Continued)

OTHER PUBLICATIONS

United States Patent Office Action for U.S. Appl. No. 16/317,354 dated Jun. 1, 2020 (42 pages).
(Continued)

*Primary Examiner* — Curtis J King
(74) *Attorney, Agent, or Firm* — Michael Best & Friedrich LLP

(57) ABSTRACT

Methods and systems for damage assessment and restoration. One system includes an electronic processor configured to receive weather data for an area of interest. The electronic processor is also configured to determine a first damage prediction for the area of interest using a damage prediction model developed with machine learning using training data, the training data including historical weather data for the area of interest and associated damage. The electronic processor is also configured to determine a restoration time estimate based on the first damage prediction for the area of interest based on different resource allocations. The electronic processor is also configured to transmit a damage assessment report for display on a user device, where the damage assessment report includes the restoration time estimate.

19 Claims, 7 Drawing Sheets

(51) Int. Cl.
G06F 9/50 (2006.01)
G06K 9/62 (2022.01)
G06N 3/08 (2006.01)
G06F 16/29 (2019.01)

(56) References Cited

U.S. PATENT DOCUMENTS

| | | | |
|---|---|---|---|
| 8,682,623 | B1 | 3/2014 | Domijan, Jr. et al. |
| 8,775,109 | B2 | 7/2014 | Curt et al. |
| 9,297,723 | B1 | 3/2016 | Hofmann et al. |
| 10,204,193 | B2 | 2/2019 | Koger et al. |
| 10,387,961 | B1* | 8/2019 | Burgess ............... G06Q 40/08 |
| 10,445,673 | B1 | 10/2019 | Hofmann et al. |
| 10,529,028 | B1* | 1/2020 | Davis .................. G06Q 40/08 |
| 10,579,749 | B1* | 3/2020 | Davis .................. G06F 30/20 |
| 10,740,684 | B1* | 8/2020 | Wani .................. G06N 20/10 |
| 11,048,021 | B2* | 6/2021 | Heng ................... G06N 7/005 |
| 2005/0096856 | A1* | 5/2005 | Lubkeman ............. G06Q 50/06 702/58 |
| 2008/0300790 | A1* | 12/2008 | Kakaire ................ G01W 1/10 702/3 |
| 2010/0131202 | A1* | 5/2010 | Dannevik ............. G01W 1/00 702/3 |
| 2011/0116387 | A1 | 5/2011 | Beeco et al. |
| 2011/0119375 | A1 | 5/2011 | Beeco et al. |
| 2011/0119517 | A1 | 5/2011 | Beeco et al. |
| 2012/0046917 | A1* | 2/2012 | Fang ................... G01W 1/10 703/1 |
| 2012/0072039 | A1 | 3/2012 | Anderson et al. |
| 2012/0136496 | A1 | 5/2012 | Black et al. |
| 2012/0150783 | A1* | 6/2012 | Jung ................. G05B 23/0224 706/46 |
| 2012/0265502 | A1* | 10/2012 | Omitaomu ............ G06Q 50/06 703/2 |
| 2012/0303278 | A1* | 11/2012 | Dannevik ............. G01W 1/00 702/3 |
| 2012/0316906 | A1 | 12/2012 | Hampapur et al. |
| 2013/0054162 | A1 | 2/2013 | Smith et al. |
| 2013/0110399 | A1* | 5/2013 | Moss ................... G01W 1/10 702/3 |
| 2013/0268196 | A1 | 10/2013 | Dam |
| 2014/0100889 | A1* | 4/2014 | Tofte ................... G06K 9/6201 705/4 |
| 2014/0156190 | A1* | 6/2014 | Cordazzo ............. G01W 1/10 702/3 |
| 2014/0236650 | A1 | 8/2014 | Davenport et al. |
| 2014/0245210 | A1* | 8/2014 | Battcher .............. G01S 13/95 715/771 |
| 2014/0281645 | A1 | 9/2014 | Sen et al. |
| 2014/0324351 | A1 | 10/2014 | Dannevik et al. |
| 2015/0170288 | A1* | 6/2015 | Harton ................ G06Q 40/08 705/4 |
| 2015/0227893 | A1* | 8/2015 | Huynh ................ G06Q 40/08 705/4 |
| 2016/0306075 | A1 | 10/2016 | Heng et al. |
| 2016/0328670 | A1* | 11/2016 | Adam .............. G06Q 10/06315 |
| 2016/0343093 | A1* | 11/2016 | Riland ............... G06Q 10/04 |
| 2017/0039307 | A1* | 2/2017 | Koger .................. G06F 30/23 |
| 2017/0169534 | A1 | 6/2017 | Wani et al. |
| 2017/0329287 | A1* | 11/2017 | Kurisu ................ G04G 13/021 |
| 2018/0005293 | A1* | 1/2018 | Adams ............. G06F 16/90335 |
| 2018/0314995 | A1* | 11/2018 | Katz ................. G06N 20/00 |
| 2018/0336652 | A1* | 11/2018 | Wani ................. G06Q 50/265 |
| 2019/0228362 | A1* | 7/2019 | Anagnostou ..... G06Q 10/06315 |
| 2019/0235604 | A1* | 8/2019 | VanBlon .............. G06F 1/3265 |
| 2019/0268283 | A1* | 8/2019 | Mukherjee ........... H04L 47/746 |
| 2019/0304026 | A1* | 10/2019 | Lyman ................ G06Q 50/165 |
| 2019/0316309 | A1* | 10/2019 | Wani ..................... E02B 1/02 |
| 2019/0318440 | A1* | 10/2019 | Wani ................... G06Q 50/265 |
| 2020/0037125 | A1* | 1/2020 | Neuert ................ G08G 1/00 |

FOREIGN PATENT DOCUMENTS

| | | |
|---|---|---|
| WO | 2011106511 A1 | 9/2011 |
| WO | 2012009724 A1 | 1/2012 |
| WO | 2015095890 A1 | 6/2015 |
| WO | 2015112892 A1 | 7/2015 |

OTHER PUBLICATIONS

Angalakudati et al., "Improving emergency storm planning using machine learning," T&D Conference and Exposition, 2014 IEEE PES, 6 pages.

Cerruti et al., "A statistical forecast model of weather-related damage to a major electric utility," Journal of Applied Meteorology and Climatology, 2012, 51:191-204.

Ciftci et al., "Analysis of the probability of failure for open-grown trees during wind storms," Probabilistic Engineering Mechanics, 2014, 37:41-50.

Davidson et al., "Electric power distribution system performance in Carolina Hurricanes," Nat Hazards Rev, 2003, 4(1):36-45.

Guikema et al., "Estimating Power Outages during Hurricanes Using Semi-Parametric Statistical Methods," Structures Congress 2008, Apr. 24-26, 2008, Vancouver, British Columbia, Canada, 9 pages.

Guikema et al., "Hybrid data mining-regression for infrastructure risk assessment based on zero-inflated data," Reliability Engineering and System Safety, 2012, vol. 99(C), pp. 178-182.

Guikema et al., "Modelling critical infrastructure reliability with generalized linear (mixed) models," Proc Int Conf Probabilistic Saf Assess Manage, PSAM, 2006, 9 pages.

Guikema et al., "Practical considerations in statistical modeling of count data for infrastructure systems," J Infrastruct Syst, 2009, 15(3): 172-178.

Guikema et al., "Predicting Hurricane Power Outages to Support Storm Response Planning," IEEE Access, 2014, vol. 2, 1364-1373.

Guikema et al., "Prestorm estimation of hurricane damage to electric power distribution systems," Risk Anal., 2010, 30(12):1744-1752.

Guikema et al., "Statistical models of the effects of tree trimming on power system outages," IEEE Trans Power Delivery, 2006, 21(3):1549-1557.

Guikema et al., "Storm power outage prediction modeling," Saf, Reliab Risk Anal: Beyond Horiz—Proc Eur Saf Reliab Conf , ESREL, 2014.

Han et al., "Estimating the spatial distribution of power outages during hurricanes in the Gulf coast region," Reliability Engineering and System Safety, 2009, 94(2):199-210.

Han et al., "Improving the predictive accuracy of hurricane power outage forecasts using generalized additive models," Risk Anal., 2009, 29(10):1443-53.

Han et al., "Integrating Models and Data to Estimate the Structural Reliability of Utility Poles During Hurricanes," Risk Analysis, 2014, 34(6):1079-1094.

International Search Report and Written Opinion for Application No. PCT/EP2016/044893 dated Oct. 27, 2016 (10 pages).

Li et al., "A statistical model for risk management of electric outage forecasts," IBM Journal of Research and Development, 2010, 54(3): 8:1-8:11.

Liu et al., "Negative binomial regression of electric power outages in hurricanes," Journal of Infrastructure Systems, 2005, 11(4):258-267.

Liu et al., "Spatial generalized linear mixed models of electric power outages due to hurricanes and ice storms," Reliability Engineering & System Safety, 2008, 93(6):875-890.

Liu et al., "Statistical forecasting of electric power restoration times in hurricanes and ice storms," IEEE Trans Power Syst, 2007, 22(4):2270-2279.

Mensah et al., "Outage predictions of electric power systems under Hurricane winds by Bayesian networks," 2014 International Conference on Probabilistic Methods Applied to Power Systems (PMAPS), 2014, 6 pages.

(56) References Cited

OTHER PUBLICATIONS

Nateghi et al., "Comparison and validation of statistical methods or predicting power outage durations in the event of hurricanes," Risk analysis, 2011, 31(12):1897-1906.

Nateghi et al., "Forecasting hurricane-induced power outage durations," Natural Hazards, 2014, 74(3):1795-1811.

Nateghi et al., "Power outage estimation for tropical cyclones: improved accuracy with simpler models," Risk Anal., 2014, 34(6):1069-78.

Quiring et al., "Importance of soil and elevation characteristics for modeling hurricane-induced power outages," Natural hazards, 2011, 58(1):365-390.

Radmer et al., "Predicting vegetation-related failure rates for overhead distribution feeders," IEEE Trans Power Delivery, 2002, 17(4):1170-1175.

Reilly et al., "Bayesian Multiscale Modeling of Spatial Infrastructure Performance Predictions with an Application to Electric Power Outage Forecasting," Journal of Infrastructure Systems, 2014, 21(2):04014036, 11 pages.

Wanik et al., "Storm outage modeling for an electric distribution network in Northeastern USA," Natural Hazards, 2015, 79:1359-1384.

Cerrai et al. "Predicting storm outages through new representations of weather and vegetation " IEEE Access, 2019, 7:29639-29654.

Eskandarpour et al., "Machine learning based power grid outage prediction in response to extreme events." IEEE Transactions on Power Systems, 2016, 32(4):3315-3316.

Jufri et al. "A Method to Forecast Storm-Caused Distribution Grid Damages Using Cost-Sensitive Regression Algorithm." 2019 IEEE Innovative Smart Grid Technologies-Asia (ISGT Asia), 2019, 3986-3990.

Rudin et al. "Machine learning for the New York City power grid." IEEE transactions on pattern analysis and machine intelligence, 2011, 34(2):328-345.

United States Patent Office Action for U.S. Appl. No. 16/317,354 dated Dec. 31, 2020 (29 pages).

* cited by examiner

SYSTEM AND METHOD FOR DAMAGE ASSESSMENT AND RESTORATION

CROSS-REFERENCE TO RELATED APPLICATION(S)

This application is a non-provisional of and claims priority to U.S. Provisional Patent Application No. 62/768,379, filed on Nov. 16, 2018, the entire contents of which are hereby incorporated by reference.

FIELD

Embodiments described herein relate to a damage assessment and restoration system, and, more particularly, to a probabilistic damage assessment and restoration system.

BACKGROUND

Currently, it is difficult to know how weather has impacted infrastructure until it has been physically inspected. These physical inspections are costly and time-consuming. Because of this it is difficult to make decisions on the restoration resources and estimate the time to restore the damaged infrastructure in a timely manner.

SUMMARY

A storm may affect hundreds of thousands of utility customers and may cause hundreds of millions of dollars of damage to property. Severe weather is among the major causes of damage to infrastructure and resultant service outages in the United States. An outage is defined as a location where a repair crew must be sent to manually intervene and fix the infrastructural network. Immediately after a weather event, information related to damages to infrastructure is incomplete. Accordingly, without an accurate damage assessment, it is difficult for a utility manager to make an informed decision with respect to, for example, resources needed to repair the damaged infrastructure in a timely manner, an estimated time to restoration of the damaged infrastructure, and the like. Furthermore, utility customers experience uncertainty with respect to their estimated time to restoration, delay in restoration, and the like. Presently there is no solution that estimates weather-related damages in the immediate hours after a weather event based on weather observations, estimates a related time to restoration, or a combination thereof.

The embodiments described herein provide a solution to these and other problems by assessing probable damages to infrastructure in near real-time immediately after a weather event and by estimating the related time to restoration. In particular, the embodiments described herein use data describing weather features, infrastructure features, environmental features, or a combination thereof, to estimate the weather-related damages to infrastructure. Statistical and probabilistic machine-learning based predictive models interpret the data and estimate the probability of damages. These modeling outputs may be further processed to describe the potential damage and estimate the related time to restoration of the infrastructure system. Having access to a damage prediction, a restoration time estimate, or a combination thereof may improve restoration times of the area of interest. For example, when a probability of damage (for example, a probability of a certain number of broken utility poles) for an area of interest is known, the deployment or allocation of available resources (for example, a repair crew) may be improved, which, ultimately, may decrease restoration times for the area of interest.

Therefore, embodiments described herein provide methods and systems of damage assessment and restoration. For example, one embodiment provides a system for damage assessment and restoration. The system includes an electronic processor configured to receive weather data for an area of interest. The electronic processor is also configured to determine a first damage prediction for the area of interest using a damage prediction model developed with machine learning using training data, the training data including historical weather data for the area of interest and associated damage. The electronic processor is also configured to determine a restoration time estimate based on the first damage prediction for the area of interest based on different resource allocations. The electronic processor is also configured to transmit a damage assessment report for display on a user device, where the damage assessment report includes the restoration time estimate.

Another embodiment provides a method for damage assessment and restoration. The method includes receiving, with an electronic processor, weather data for an area of interest. The method also includes determining, with the electronic processor, a damage prediction for the area of interest using a damage prediction model developed with machine learning. The method also includes determining, with the electronic processor, a restoration time estimate for the area of interest using a restoration time model developed with machine learning, the restoration time estimate based on the damage prediction for the area of interest. The method also includes transmitting, with the electronic processor, a damage assessment report for display on a user device, where the damage assessment report includes the restoration time estimate.

A non-transitory, computer-readable medium including instructions that, when executed by an electronic processor, cause the electronic processor to execute a set of functions. The set of functions includes receiving weather data for an area of interest. The set of functions also includes determining a damage prediction for the area of interest using a damage prediction model developed with machine learning using training data, the training data including historical weather data for the area of interest and associated damage. The set of functions also includes determining a restoration time estimate based on the damage prediction for the area of interest. The set of functions also includes transmitting a damage assessment report for display on a user device, where the damage assessment report includes the restoration time estimate. The set of functions also includes receiving actual damage data for the area of interest. The set of functions also includes determining a new restoration time estimate based on the actual damage data for the area of interest. The set of functions also includes transmitting a subsequent damage assessment report for display on the user device, where the subsequent damage assessment report includes the new restoration time estimate.

Other aspects of the application will become apparent by consideration of the detailed description and accompanying drawings.

DETAILED DESCRIPTION

Figure 1:
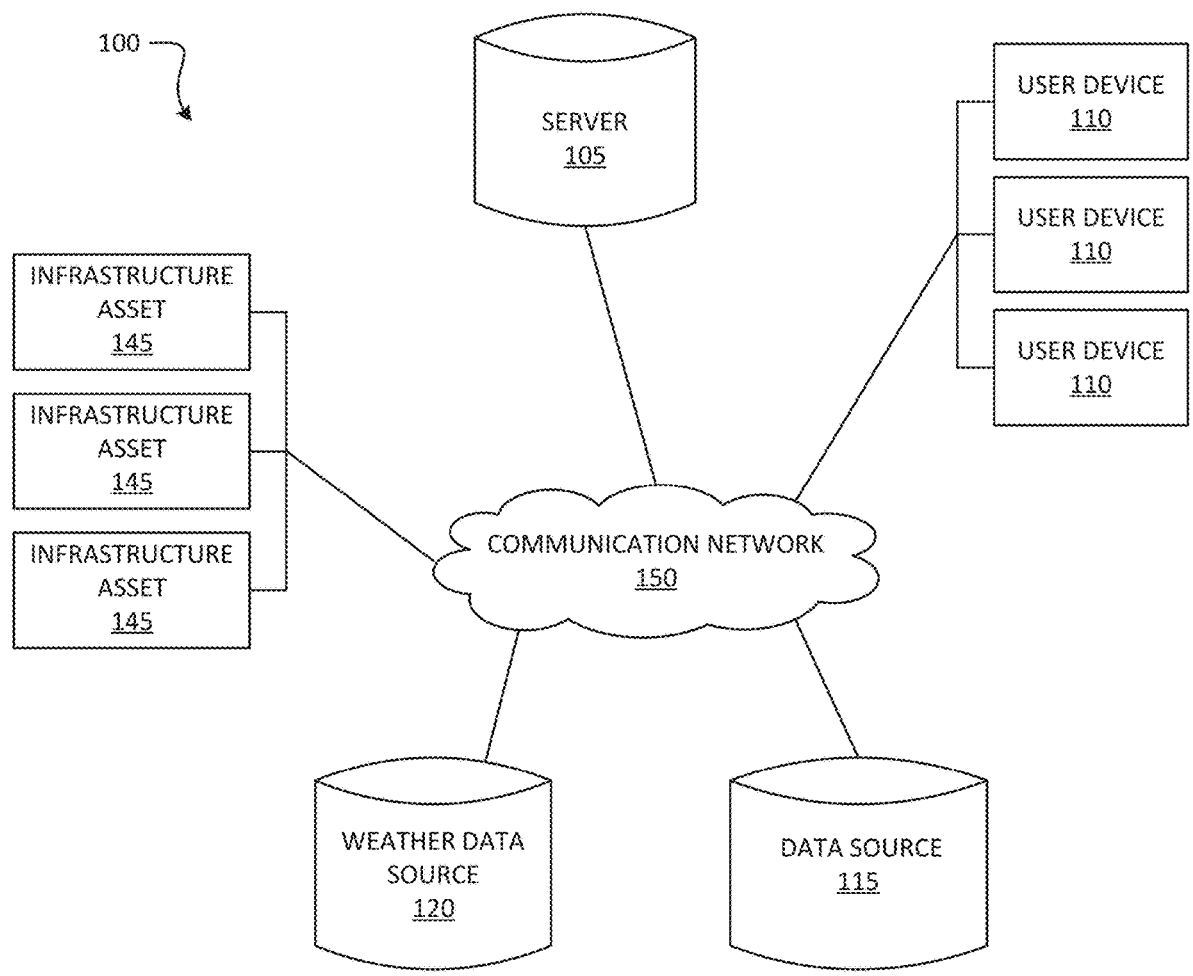
FIG. 1 illustrates a system for damage assessment and restoration according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification may include one or more electronic processors, one or more memory modules including non-transitory computer-readable medium, one or more input/output interfaces, and various connections (for example, a system bus) connecting the components.

As noted above, it is difficult to know how weather has impacted infrastructure until the infrastructure is physically inspected. Such physical inspections are costly and time-consuming. Immediately after a weather event, information related to damages to infrastructure is incomplete. Accordingly, without an accurate damage assessment, it is difficult for a utility manager to make an informed decision with respect to, for example, resources needed to repair the damaged infrastructure in a timely manner, an estimated time to restoration of the damaged infrastructure, and the like. Furthermore, utility customers experience uncertainty with respect to their estimated time to restoration, delay in restoration, and the like. To solve these and other problems, the embodiments described herein provide a solution to these problem by assessing probable damages to infrastructure in near real-time immediately after a weather event and by estimating the related time to restoration.

FIG. 1 illustrates a system 100 for damage assessment and restoration according to some embodiments. The system 100 includes a server 105, one or more user devices 110 (referred to herein collectively as "the user devices 110" and individually as "the user device 110"), a data source 115, a weather data source 120, and one or more infrastructure assets 145 (referred to herein collectively as "the infrastructure assets 145" and individually as "the infrastructure asset 145"). It should be understood that the system 100 may include fewer, additional, or different components than those illustrated in FIG. 1 in various configurations and may perform additional functionality than the functionality described herein. For example, the system 100 may include multiple servers 105, multiple data sources 115, multiple weather data sources 120, or a combination thereof. Additionally, three user devices 110 and three infrastructure assets 145 are illustrated in FIG. 1 as one example but more or less user devices 110, infrastructure assets 145, or a combination thereof may communicate with the server 105 in various embodiments. Also, in some embodiments, the server 105, the data source 115, the weather data source 120, or a combination thereof may be combined into a single database or server or distributed among multiple databases or servers.

The server 105, the user devices 110, the data source 115, the weather data source 120, and the infrastructure assets 145 communicate over one or more wired or wireless communication networks 150. Portions of the communication networks 150 may be implemented using a wide area network, such as the Internet, a local area network, such as Bluetooth™ network or Wi-Fi, and combinations or derivatives thereof. It should be understood that in some embodiments, additional communication networks may be used to allow one or more components of the system 100 to communicate. Also, in some embodiments, components of the system 100 may communicate directly as compared to through a communication network 150 and, in some embodiments, the components of the system 100 may communicate through one or more intermediary devices not shown in FIG. 1.

Figure 2:
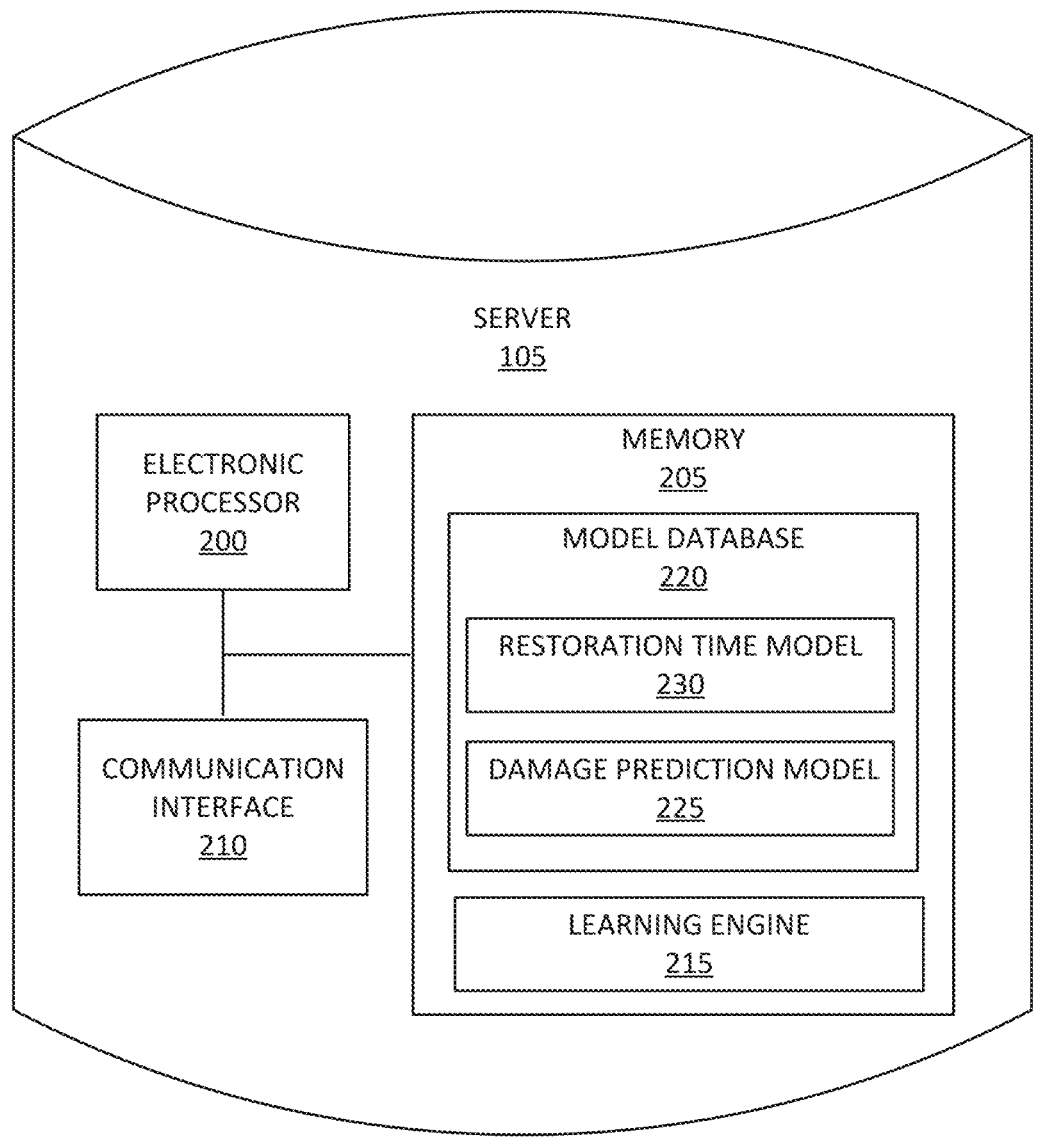
FIG. 2 illustrates a server included in the system of FIG. 1 according to some embodiments.

As illustrated in FIG. 2, the server 105 includes an electronic processor 200 (for example, a microprocessor, an application-specific integrated circuit (ASIC), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. It should be understood that the server 105 may include additional components than those illustrated in FIG. 2 in various configurations and may perform additional functionality than the functionality described herein. For example, in some embodiments, the functionality described herein as being performed by the server 105 may be distributed among multiple servers or devices (including as part of services offered through a cloud service), may be performed by one or more of the user devices 110, another server, or a combination thereof. In addition, in some embodiments, one or more of the user devices 110 may be configured to perform all or a portion of the functionality described herein as being performed by the server 105.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 may store a learning engine 215 and a model database 220. In some embodiments, the learning engine 215 develops one or more models using one or more machine learning functions. Machine learning functions are generally functions that allow a computer application to learn without being explicitly programmed. In particular, the learning engine 215 is configured to develop an algorithm or model based on training data. For example, to perform supervised learning, the training data includes example inputs and corresponding desired (for example, actual) outputs, and the learning engine 215 progressively develops a model (for example, a damage prediction model or a restoration time model) that maps inputs to the outputs included in the training data. Machine learning performed by the learning engine 215 may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 215 to ingest, parse, and understand data and progressively refine models for data analytics.

Alternatively or in addition, the learning engine 215 develops the one or more models using machine learning methods and mechanisms capable of accurate quantile regression, including but not limited to Bayesian additive regression trees, quantile regression forests, quantile regression Gaussian processes, quantile regression neural networks, and the like. In some embodiments, the learning engine 215 develops the one or more models using a collection of well-tuned machine learning algorithms and combines the outputs of the algorithms (either neutrally or optimized based on performance characteristics) to increase accuracy of the one or more models.

As noted above, the learning engine 215 is configured to develop one or more models using training data. Accordingly, in some embodiments, the learning engine 215 (via the electronic processor 200) accesses a training record that includes training data, such as historical weather data, infrastructural data, environmental data, and the like. In some embodiments, the training record is stored in the memory 205 of the server 105. However, in other embodiments, the training record is stored on a device external to the server 105, such as, for example, the data source 115.

For example, the learning engine 215 (as executed by the electronic processor 200) may perform machine learning using training data to develop a damage prediction model 225. The training data for the damage prediction model 225 may include, for example, historical weather data for an area of interest and associated damage. For example, the learning engine 215 may identify one or more unique characteristics of the historical weather data for the area of interest (for example, a weather observation feature, such as a wind speed, a precipitation amount, and the like) and develop the damage prediction model 225 that maps the one or more unique characteristics to a particular damage prediction for the area of interest. Accordingly, when a subsequent occurrence of weather data for the area of interest occurs, the electronic processor 200 may determine a damage prediction for that subsequent occurrence of weather data using the damage prediction model 225 developed by the learning engine 215. In other words, the electronic processor 200 may determine a damage prediction for the area of interest using the damage prediction model 225 that analyzes the weather data.

As noted above, the training data may also include infrastructural data, and environmental data, or a combination thereof. Accordingly, in some embodiments, the learning engine 215 may identify one or more unique characteristics of the infrastructural data for an area of interest (for example, an age of an infrastructure asset 145 in the area of interest), the environmental data for an area of interest (for example, a leaf area index for the area of interest), the historical weather data for the area of interest, or a combination thereof. The learning engine 215 may develop the damage prediction model 225 that maps the one or more unique characteristics to a particular damage prediction for the area of interest.

Additionally, the learning engine 215 (as executed by the electronic processor 200) may perform machine learning using training data to develop a restoration time model 230. The training data for the restoration time model 230 may include, for example, historical damage prediction data for an area of interest and associated historical restoration time data. For example, the learning engine 215 may identify one or more unique characteristics of the historical damage prediction data for the area of interest and develop the restoration time model 230 that maps the one or more unique characteristics to a particular restoration time for the area of interest. Accordingly, when a subsequent damage prediction for the area of interest is determined, the electronic processor 200 may determine a restoration time estimate for that subsequent damage prediction using the restoration time model 230 developed by the learning engine 215. In other words, the electronic processor 200 determines a restoration time estimate for the area of interest using the restoration time model 230 that analyzes the damage prediction for the area of interest.

The one or more models developed by the learning engine 215 are stored in the model database 220. For example, as illustrated in FIG. 2, the model database 220 stores the damage prediction model 225 and the restoration time model 230. As illustrated in FIG. 2, the model database 220 is included in the memory 205 of the server 105. It should be understood, however, that, in some embodiments, the model database 220 is included in a separate device accessible by the server 105 (included in the server 105 or external to the server 105).

The communication interface 210 allows the server 105 to communicate with devices external to the server 105. For example, as illustrated in FIG. 1, the server 105 may communicate with the user devices 110, the data source 115, the weather data source 120, the infrastructure assets 145, or a combination thereof. The communication interface 135 may include a port for receiving a wired connection to an external device (for example, a universal serial bus ("USB") cable and the like), a transceiver for establishing a wireless connection to an external device (for example, over one or more communication networks 150, such as the Internet, local area network ("LAN"), a wide area network ("WAN"), and the like), or a combination thereof.

The user devices 110 may include one or more desktop computers, laptop computers, tablet computers, terminals, smart telephones, smart televisions, smart wearables, servers, databases, other types of computing devices, or a combination thereof. Although not illustrated in FIG. 1, the user devices 110 may include similar components as the server 105, such as an electronic processor, a memory, and a communication interface. The user devices 110 may also include one or more input devices (for example, a keyboard, a keypad, a mouse, a joystick, a touchscreen, and the like) and one or more output devices (for example, a display device, a touchscreen, a printer, a speaker, and the like) that receive input from and provide output to a user.

The data source 115 may store and provide data associated with an area of interest, such as historical weather data, environmental data, infrastructural data, and the like. The historical weather data includes data relating to a historical weather event that occurred at the area of interest. For example, the historical weather data may include a mean, a median, a maximum, and a minimum with respect to a wind speed, a wind gust, an amount of precipitation, a pressure, a humidity, a temperature, or a combination thereof for a historical weather event. Alternatively or in addition, the historical weather data may include a count of observed cloud-to-ground lightning strikes for a historical weather event. The environmental data includes data relating to an environmental feature or characteristic of the area of interest. For example, the environmental data may include a predominant type of land cover (for example, near an infrastructure asset 145), a soil characteristic, a soil composition, a type of tree, a species of tree, a current state of near-by foliage, a vegetation characteristic, a terrain characteristic, an orographic characteristic, and the like. The infrastructural data includes data relating to an infrastructure of the area of interest, such as one or more of the infrastructure assets 145 of the area of interest. An infrastructure asset 145 may include, for example, a utility pole, a transformer, a utility line, or another type of infrastructure asset. For example, the infrastructural data may include an exposure of the infrastructure asset 145 to a specific type of weather event, a vulnerability of the infrastructure asset 145 to a specific type of weather event, a distance between the infrastructure asset 145 and a potential hazard (for example, a tree), or a combination thereof. Alternatively or in addition, the infrastructural data may include a count of the infrastructure assets 145 of the area of interest, a type of the infrastructure asset 145, an age of the infrastructure asset 145, another characteristic of the infrastructure asset 145, or a combination thereof. In some embodiments, the infrastructural data includes real-time (or near real-time) data relating to an operational status of the infrastructure asset 145. In such embodiments, the infrastructure asset 145 may include one or more sensors configured to detect the operational status of the infrastructure asset 145. Alternatively or in addition, the infrastructure asset 145 may be part of a supervisory control and data acquisition ("SCADA") system. Although not illustrated in FIG. 1, the data source 115 may include similar components as the server 105, such as an electronic processor, a memory, and a communication interface.

In some embodiments, data stored in the data source 115 is processed in order to obtain a homogeneous dataset at a common spatial resolution (for example, at a common spatial resolution of one or more sub-areas of the area of interest). In another embodiment, the data stored in the data source 115 may be directly matched with one or more of the infrastructure assets 145 in order to obtain a dataset describing environmental conditions for each of the infrastructure assets 145.

Figure 3:
FIG. 3 illustrates a training record including historical weather data according to some embodiments.

As noted above, in some embodiments, the data source 115 stores the training data used by the learning engine 215 to develop one or more models. Accordingly, in such embodiments, the data source 115 stores one or more training records that include the training data. FIG. 3 illustrates a training record 300 according to some embodiments. In the example illustrated in FIG. 3, the training record 300 includes identification data that identifies an area of interest and a corresponding historical weather event. For each area of interest and corresponding historical weather event, the training record 300 includes historical weather data (for example, a maximum temperature, a maximum wind speed, and the like), infrastructural data (for example, a pole count, a pole age, and the like), and environmental data (for example, a branch distance, a leaf area index, and the like) associated with each area of interest and corresponding historical weather event.

The weather data source 120 may store and provide weather data. The weather data describes weather observations relating to a weather event or hazard, such as wind, precipitation, pressure, humidity, temperature, and the like. In some embodiments, the weather data describes real-time or near real-time weather observations. Alternatively or in addition, the weather data describes recent weather observations (for example, weather observations from the past twelve hours). The weather data may include a mean, a median, a maximum, and a minimum with respect to a wind speed, a wind gust, an amount of precipitation, a pressure, a humidity, a temperature, or a combination thereof. Alternatively or in addition, the weather data may include a count of observed cloud-to-ground lightning strikes, a radar reflectivity, or a combination thereof. The weather data source 120 may include, for example, a weather station, a weather radar, a weather satellite, and the like. Alternatively or in addition, in some embodiments, the weather data source 120 is a low-latency real-time weather analysis product. Accordingly, in some embodiments, the weather data may include a weather nowcast (in example, a weather forecast for a short term period of time, such as two hours), a weather station observation, a radar observation, an observed lightning strikes, a satellite observation, a short-term weather forecast (for example, within twelve hours), and the like, where the weather data is parsed into individual characteristics (for example, a wind speed, a wind gust, an amount of precipitation, a pressure, a humidity, a temperature, or a combination thereof). Although not illustrated in FIG. 1, the weather data source 120 may include similar components as the server 105, such as an electronic processor, a memory, and a communication interface.

A user may use the user device 110 to access and view a damage assessment report (including a damage prediction, a restoration time estimate, and the like) associated with one or more areas of interest. For example, the user may access the damage assessment report (through a browser application or a dedicated application stored on the user device 110 that communicates with the server 105) and view the damage assessment report on a display device associated with the user device 110. As noted above, it is difficult to know how weather has impacted infrastructure until the infrastructure is physically inspected. Accordingly, without an accurate damage assessment, it is difficult for a utility manager to make an informed decision with respect to, for example, resources needed to repair the damaged infrastructure in a timely manner, an estimated time to restoration of the damaged infrastructure, and the like. Furthermore, utility customers experience uncertainty with respect to their estimated time to restoration, delay in restoration, and the like. The embodiments described herein provide a solution to these and other problems by assessing probable damages to infrastructure in near real-time immediately after a weather event and by estimating the related time to restoration.

Figure 4:
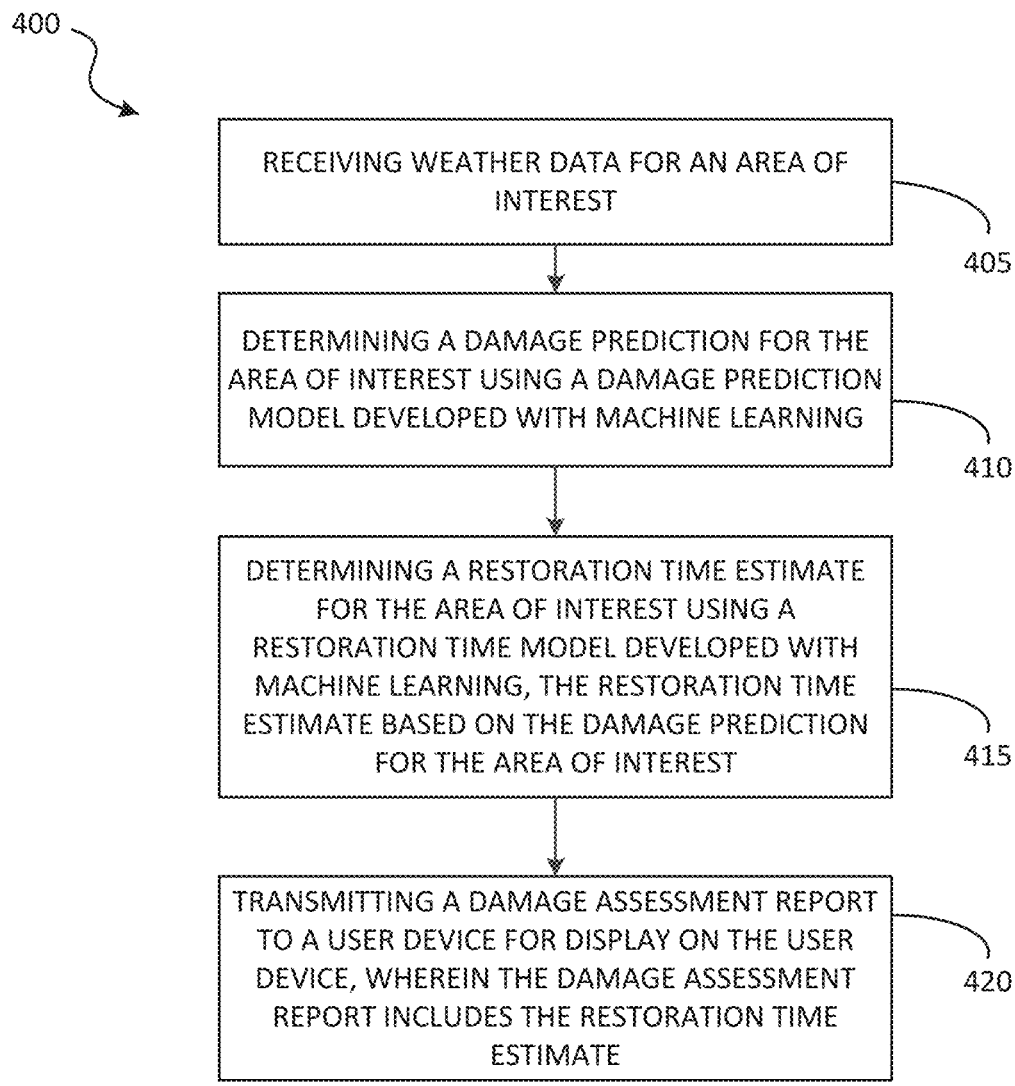
FIG. 4 is a flowchart of a method for damage assessment and restoration using the system of FIG. 1 according to some embodiments.

For example, FIG. 4 is a flowchart illustrating a method 400 for damage assessment and restoration according to some embodiments. The method 400 is described here as being performed by the server 105 (the electronic processor 200 executing instructions). However, as noted above, the functionality performed by the server 105 (or a portion thereof) may be performed by other devices, including for example, one or more of the user devices 110 (via an electronic processor executing instructions).

As illustrated in FIG. 4, the method 400 includes receiving, with the electronic processor 200, weather data for an area of interest (at block 405). In some embodiments, the electronic processor 200 receives the weather data via the communication interface 210 from the weather data source 120 over the communication network 150. In some embodiments, the weather data may be stored at additional or different databases, servers, devices, or a combination thereof. Accordingly, in such embodiments, the electronic processor 200 receives the weather data from additional or different databases, servers, devices, or a combination thereof. In some embodiments, the electronic processor 200 receives the weather data in response to a request received from, for example, the user device 110. Alternatively or in addition, the electronic processor 200 may continuously receive the weather data or receive the weather data at predetermined intervals (for example, every hour).

Figure 5:
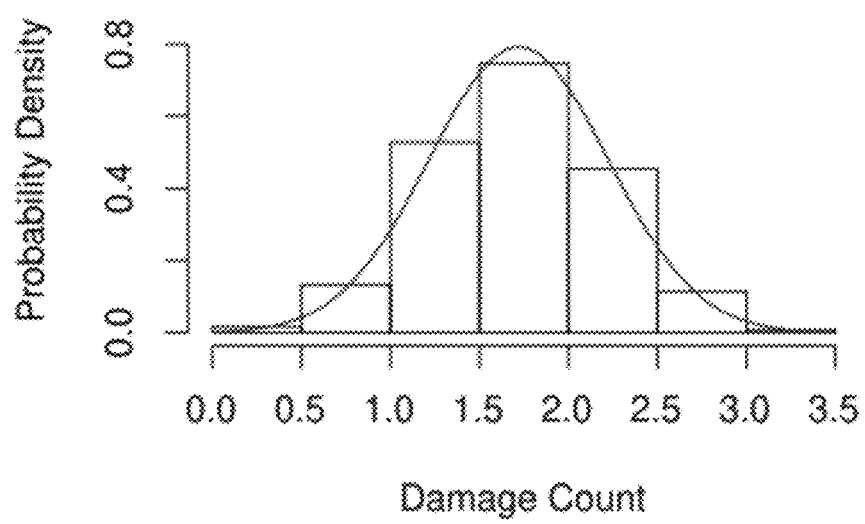
FIG. 5 illustrates a damage occurrence probability distribution according to some embodiments.

After receiving the weather data (at block 405), the electronic processor 200 determines a damage prediction for the area of interest (at block 410). The damage prediction may be a damage occurrence probability distribution that describes a probability of different amounts of damage for the area of interest. For example, FIG. 5 graphically illustrates a damage occurrence probability distribution according to some embodiments. In some embodiments, the damage prediction is specific to a particular damage type (for example, a downed wire, a broken utility pole, a broken cross-arm, a damaged electrical component, a ruptured pipe, and the like). In other words, the electronic processor 200 may determine a plurality of damage predictions for an area of interest, where each of the damage predictions for the area of interest are specific to a particular damage type.

In some embodiments, the electronic processor 200 determines the damage prediction for the area of interest using the damage prediction model 225. Accordingly, in response to receiving the weather data, the electronic processor 200 determines the damage prediction for the area of interest by accessing the damage prediction model 225 from the model database 220 and analyzing the weather data using the damage prediction model 225.

Alternatively or in addition, in some embodiments, the electronic processor 200 accesses additional data for the area of interest and determines the damage prediction for the area of interest based on the additional data. For example, in such embodiments, the electronic processor 200 may access the data from the data source 115, such as the infrastructural data and the environmental data associated with the area of interest. The environmental data, infrastructural data, or a combination thereof may provide additional insight regarding characteristics that may impact the damage prediction for the area of interest. For example, when the environmental data indicates that the area of interest is primarily marsh land with several old trees, the electronic processor 200 may determine a higher damage prediction for the area of interest (as a likelihood of a tree damaging an infrastructure asset 145 is more likely than an area of interest that has less trees). As another example, when the infrastructural data indicates that the infrastructure assets 145 included in an area of interest are older and are scheduled for maintenance, the electronic processor 200 may determine a higher damage prediction for the area of interest (as a likelihood of one or more of the infrastructure assets 145 being damaged is more likely than an area of interest where the infrastructure assets 145 are newer or more-recently maintained).

In some embodiments, the electronic processor 200 determines a plurality of damage predictions for the area of interest. For example, in some embodiments, the electronic processor 200 divides the area of interest into a plurality of sub-areas. The electronic processor 200 may divide the area of interest into sub-areas based on a regular shaped grid, irregularly shaped geographic regions (for example, census blocks, towns, counties, and the like), and the like. Alternatively or in addition, the electronic processor 200 may divide the area of interest into sub-areas based on one or more of the infrastructure assets 145 (for example, based on a location of the infrastructure assets 145). Accordingly, the electronic processor 200 may determine a plurality of damage predictions for each of the sub-areas of the area of interest.

Additionally, the electronic processor 200 may downscale the damage prediction to an infrastructure asset level. The electronic processor 200 may downscale the damage predictions to the infrastructure asset level based on, for example, a statistical analysis of their individual exposure and vulnerability to the weather hazard. The electronic processor 200 may access and analyze infrastructural data associated with each of the infrastructure assets 145 to determine a damage prediction for each of the infrastructure assets 145. In other words, the electronic processor 200 may determine a damage prediction for each of the infrastructure assets 145 in an area of interest. With such an infrastructure asset level analysis, the electronic processor 200 may perform additional analysis to estimate a probability that each user or customer of the infrastructural system of the area of interest may be effected with an outage or service interruption.

In some embodiments, the electronic processor 200 analyzes (or interprets) one or more of the damage predictions (for example, the damage occurrence probability distributions) and uses information about logistical needs of repairs, a potentially networked nature of the infrastructure of the area of interest, or a combination thereof to more fully describe or determine the nature of the probable impacts caused by the recent weather hazard (as represented by the received weather data). The electronic processor 200 may aggregate the damage predictions of each sub-area in the area of interest and generate a summary of how much total damage probably was caused across the area of interest (for example, by town, county, state, region, nation, and the like) for each damage type. Based on this total estimate and information about repair and restoration procedure, the electronic processor 200 may also estimate the type and amount of material required to repair all of the damages. Accordingly, in some embodiments, the electronic processor 200 determines a logistical material estimate. The logistical material estimate may include, for example, a type of material needed to repair damage, an amount of material needed to repair damage, a tool or piece of equipment needed to repair damage, and the like. The electronic processor 200 may determine the logistical material estimate based on the damage prediction for the area of interest, infrastructural data for the area of interest, environmental data for the area of interest, or a combination thereof.

Figure 6:
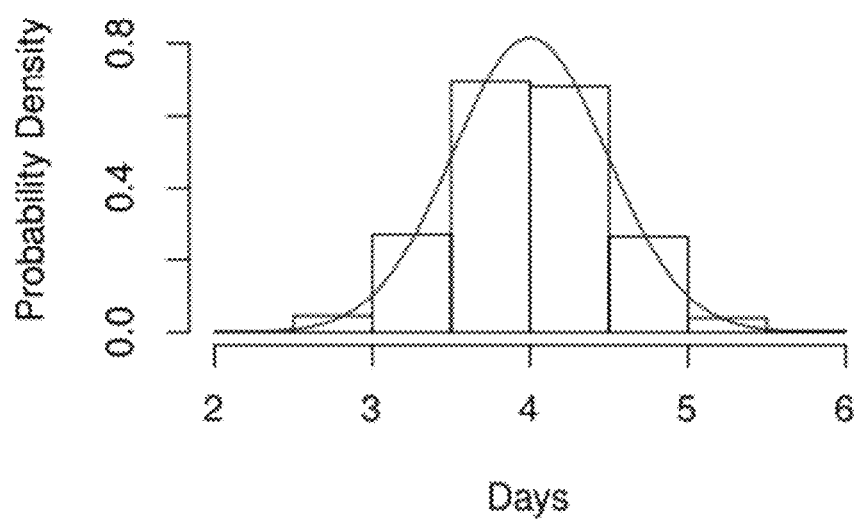
FIG. 6 illustrates a time to restoration probability distribution according to some embodiments.

As illustrated in FIG. 4, the electronic processor 200 also determines a restoration time estimate for the area of interest (at block 415). In some embodiments, the electronic processor 200 determines the restoration time estimate based on the damage prediction for the area of interest. Alternatively or in addition, in some embodiments, the electronic processor 200 determines the restoration time estimate for the area of interest using the restoration time model 230. The restoration time estimate is an estimated amount of time to restore an infrastructure of the area of interest (for example, repair damage that occurred to one or more of the infrastructure asserts 145 included in the area of interest). In some embodiments, the restoration time estimate is a probability distribution describing the probability of a restoration of a particular time length. For example, FIG. 6 graphically illustrates a time to restoration probability distribution according to some embodiments.

In some embodiments, the electronic processor 200 may determine the restoration time estimate based on an availability of resources (for example, an availability of repair materials, an availability of repair crews, an availability of equipment, and the like). Accordingly, the electronic processor 200 determines a range of potential deployed resources and determines the restoration time estimate based on different resource deployments. For example, the electronic processor 200 may determine a feasible range of an availability of resources and determine the restoration time estimate based on the feasible range of the availability of resources. In such embodiments, the electronic processor 200 may access and analyze resource data. The resource data may be stored in the memory 205 of the server 105, stored in a device external to the server 105 (for example, the data source 115), or a combination thereof. The resource data may include, for example, a crew location, a crew experience, a number of available crews, a crew type, an infrastructure asset priority status, an infrastructure asset accessibility, a number of damaged infrastructure assets, a road condition, a safety consideration, an available tool and equipment, a replacement part availability, and the like.

Furthermore, in some embodiments, the electronic processor 200 automatically prioritizes available resources and manages allocation of the available resources for the area of interest. The electronic processor 200 may automatically prioritize available resources and manage allocation of the available resources based on a damage prediction for the area of interest, a restoration time estimate, other data (for example, the infrastructural data or the environmental data), or a combination thereof. For example, the electronic processor 200 may determine that repairing an infrastructure of a first area of interest is more of a priority than repairing an infrastructure of a second area of interest. As a result, the electronic processor 200 may allocate (or deploy) available resources to the first area of interest first over the second area of interest. The electronic processor 200 may apply the one or more models at different spatial scales to, for example, give localized restoration times. Based on this, different levels of resources may be allocated to the restoration so that the optimal amount of resources may be determined for the fastest or most efficient way to achieve full restoration of the infrastructural system.

After determining the restoration time estimate for the area of interest (at block 415), the electronic processor 200 generates and transmits a damage assessment report for display on one or more of the user devices 110 (at block 420). The damage assessment report may include restoration time estimates based on resource allocation, the availability of resources, the damage assessment, a logistical material estimate, or a combination thereof. In some embodiments, the damage assessment report includes a plurality of damage predictions (for example, a first damage prediction, a second damage prediction, a third damage prediction, and the like). For example, the damage assessment report may include a damage assessment associated with the area of interest, such as a total damage assessment, a damage assessment associated with an infrastructure asset 145 of the area of interest, a damage assessment associated with a sub-area of the area of interest, and the like.

In some embodiments, the electronic processor 200 determines an uncertainty associated with a damage prediction, a restoration time estimate, an availability of resources, a logistical material estimate, or a combination thereof. In such embodiments, the electronic processor 200 includes an uncertainty indication in the damage assessment report. For example, the electronic processor 200 may determine an uncertainty associated with the restoration time estimates given various levels of resource allocation and include an uncertainty indication associated with the restoration time estimate in the damage assessment report.

Figure 7:
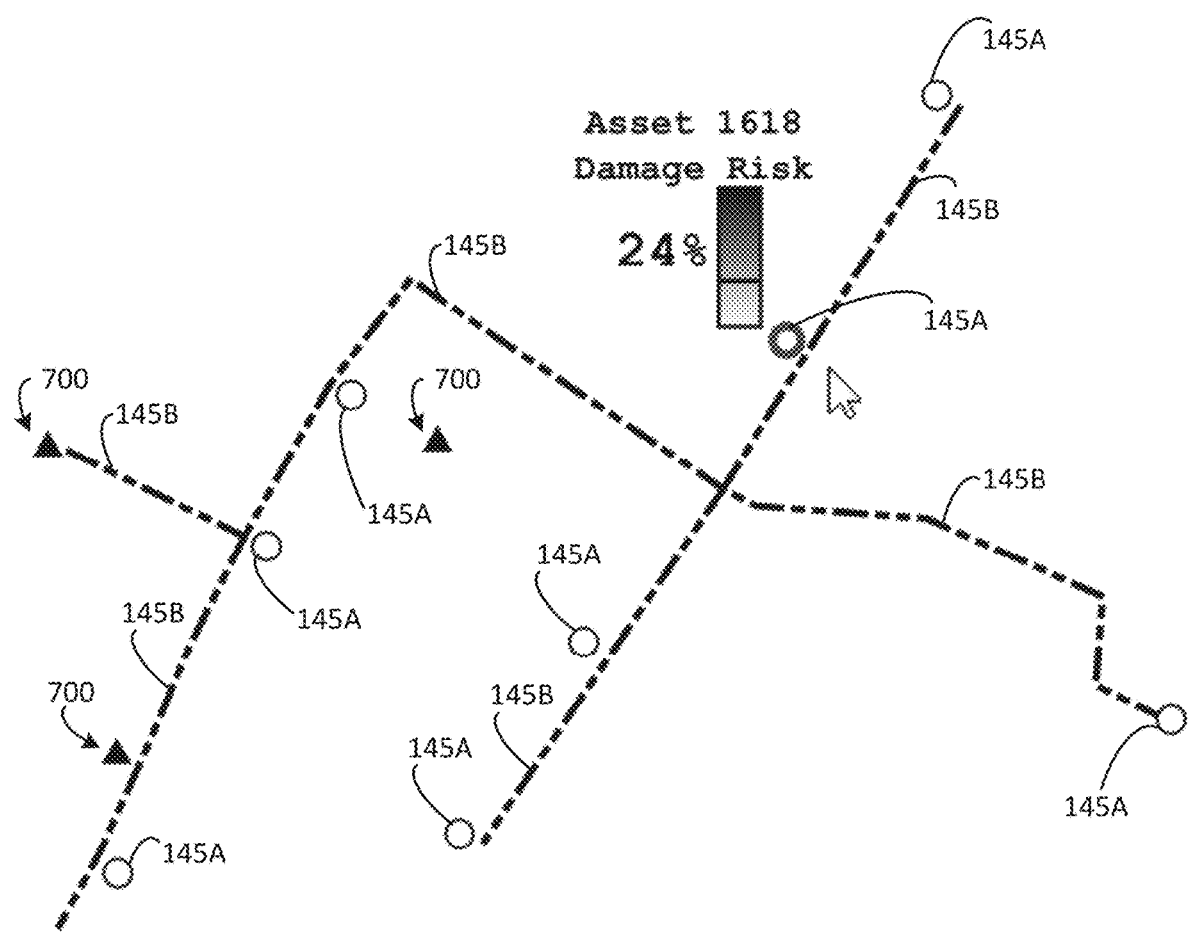
FIG. 7 illustrates a damage assessment report according to some embodiments.

FIG. 7 illustrates a damage assessment report according to some embodiments. In the example illustrated in FIG. 7, the damage assessment report includes a graphical representation of an area of interest. The area of interest includes a plurality of infrastructure assets 145, including a plurality of utility poles 145A connected by various sections of utility lines 145B. The area of interest also includes a plurality of hazards 700 (for example, a tree). As noted above, a user may use the user device 110 to access and view a damage assessment report associated with one or more areas of interest (for example, through a browser application or a dedicated application stored on the user device 110 that communicates with the server 105). The user may also interact with the damage assessment report. For example, as illustrated in FIG. 7, a user may select an individual infrastructure asset to view damage assessment information for the selected individual infrastructure asset.

The information provided in the damage assessment report may be made available to users as various spatial scales such that a user may access and view a probability of a particular damage, a restoration time estimate based on different resource allocations, and the like for an entire region, a single infrastructure asset 145, a particular customer, and the like. For example, a user may interact with the damage assessment report such that the damage assessment report is manipulated to report only specific types of damage and other specific information to enhance usability for the user.

Alternatively or in addition, in some embodiments, the information relating to the infrastructural system of the area of interest may be communicated to one or more users via an alert. For example, the electronic processor 200 may generate and transmit an alert (for example, an SMS or MMS text message, an electronic mail message, an automated phone call, and the like) to one or more users. Parameters of the alert may be customizable to ensure only the most important and pertinent information is passed to each user while more detailed information is made available to users through automated reports, an interactive website published on the internet, and the like (for example, the damage assessment report of FIG. 7).

Alternatively or in addition, in some embodiments, information about the probable damages to a particular area is used to direct additional damage assessment activities. For example, the electronic processor 200 may identify an area where the probability of severe or widespread damage is particularly high. To better understand the actual damages in that area, utility managers may then choose to dispatch ground-based damage assessment crews, drones (UAV), damage assessment flights, or the like. It is otherwise difficult for utility managers to know how best to deploy these types of costly and limited damage assessment resources.

In some embodiments, the electronic processor 200 receives actual damage data associated with the actual damage that occurred in the area of interest caused by a recent weather hazard (for example, actual damage that occurred to an infrastructure asset 145 in the area of interest). The actual damage data may include, for example, a customer reported service outage, an operational status communicated by one or more networked infrastructure assets 145, an overhead drone survey, an on-site damage assessment performed by personnel, or a combination thereof.

The electronic processor 200 may use the actual damage data as feedback data for one or more of the models developed via the learning engine 215. In other words, the electronic processor 200 may use the actual damage data to modify, update, and refine one or more of the models developed via the learning engine 215 such that the outputs of the one or more models are better reflect an observed reality. For example, the electronic processor 200 may update the damage prediction model 225, the restoration time model 230, or a combination thereof based on the feedback data. To achieve these results, the electronic processor 200 may apply a state-space model, Bayesian inference, or other techniques to the probabilistic output of the one or more models. After updating the one or more models using the feedback data (for example, the actual damage data), the electronic processor 200 may determine a new restoration time estimate, a new damage prediction, or a combination thereof. Additionally, the electronic processor 200 may generate a new damage assessment report (for example, a subsequent damage assessment report) that includes the new restoration time estimate, the new damage prediction, other updated information, or a combination thereof and transmit the new damage assessment report to the user device 110 for display to a user. In other words, based on the actual damage data, the methods and systems described herein provide a user with a constant up-to-date best estimate of the actual damages to an infrastructural system across the area of interest.

Accordingly, the embodiments described herein provide a solution to problems with existing damage assessment and restoration technology by assessing probable damages to infrastructure in near real-time immediately after a weather event and by estimating the related time to restoration. In particular, the embodiments described herein use data describing weather features, infrastructure features, environmental features, or a combination thereof, to estimate the weather-related damages to infrastructure. Statistical and probabilistic machine-learning based predictive models interpret the data and estimate the probability of damages. These modeling outputs may be further processed to describe the potential damage and estimate the related time to restoration of the infrastructure system based on various resource allocations. Having access to a damage prediction, a restoration time estimate, or a combination thereof may improve restoration times of the area of interest. For example, when a probability of damage for an area of interest is known, the deployment or allocation of available resources (for example, a repair crew) may be improved, which, ultimately, may decrease restoration times for the area of interest.

In other words, the embodiments described herein allow a user to know a current infrastructure condition. With such information, a user (for example, a utility customer and utility personnel) will be able to take better decisions regarding equipment and human resources allocation for an efficient restoration. Additionally, the embodiments described herein allow a user to provide a customer, an investor, a regulatory body, and the like with an immediate estimation of damage to an infrastructural system and a restoration time estimate for the infrastructural system to reach full restoration based on information available from real-time, multi-sensor environmental conditions.

Various features and advantages of the application are set forth in the following claims.

What is claimed is:

1. A system for damage assessment and restoration, the system comprising:
   an electronic processor configured to
      receive weather data for an area of interest, wherein the weather data includes a weather observation for a weather event,
      determine a first damage prediction for the area of interest using a damage prediction model developed with machine learning using training data, the training data including historical weather data for the area of interest and associated damage,
      determine a restoration time estimate based on the first damage prediction for the area of interest based on different resource allocations,
      determine a feasible range of an availability of resources and determine the restoration time estimate further based on the feasible range of the availability of resources, and
      transmit a damage assessment report for display on a user device, wherein the damage assessment report includes the restoration time estimate.

2. The system of claim 1, wherein the electronic processor is configured to access additional data for the area of interest and determine the first damage prediction for the area of interest based on the additional data for the area of interest, wherein the additional data includes at least one selected from a group consisting of environmental data and infrastructural data.

3. The system of claim 1, wherein the electronic processor is configured to determine the first damage prediction for the area of interest by dividing the area of interest into a plurality of sub-areas, and determining a plurality of damage predictions, wherein each of the plurality of damage predictions is associated with each of the plurality of sub-areas of the area of interest.

4. The system of claim 1, wherein the electronic processor is configured to determine the first damage prediction for the area of interest by determining a plurality of damage predictions, wherein each of the plurality of damage predictions is associated with an infrastructure asset of the area of interest.

5. The system of claim 1, wherein the electronic processor is configured to determine the restoration time estimate using a restoration time model developed using machine learning.

6. The system of claim 1, wherein the electronic processor is further configured to determine a logistical material estimate, the logistical material estimate including at least one selected from a group consisting of a type of material to repair damage to the area of interest, an amount of material to repair damage to the area of interest, and equipment to repair damage to the area of interest.

7. The system of claim 1, wherein the damage assessment report includes at least one selected from a group consisting of a logistical material estimate, an availability of resources, the first damage prediction for the area of interest, a second damage prediction associated with an infrastructure asset of the area of interest, a third damage prediction associated with a sub-area of the area of interest, and an uncertainty indication associated with the restoration time estimate.

8. The system of claim 1, wherein the electronic processor is further configured to receive actual damage data, wherein the actual damage data includes an operational status communicated by an infrastructure asset in the area of interest.

9. The system of claim 8, wherein the electronic processor is further configured to determine a new restoration time estimate based on the actual damage data for the area of interest and transmit a subsequent damage assessment report for display on the user device, wherein the subsequent damage assessment report includes the new restoration time estimate.

10. The system of claim 8, wherein the electronic processor is configured to update the damage prediction model based on the actual damage data.

11. The system of claim 1, wherein the electronic processor is further configured to automatically prioritize available resources and manage allocation of the available resources for the area of interest based on at least one selected from the group consisting of the first damage prediction and the restoration time estimate.

12. A method for damage assessment and restoration, the method comprising:
receiving, with an electronic processor, weather data for an area of interest, wherein the weather data includes a weather observation for a weather event;
determining, with the electronic processor, a damage prediction for the area of interest using a damage prediction model developed with machine learning;
determining, with the electronic processor, a restoration time estimate for the area of interest using a restoration time model developed with machine learning, the restoration time estimate based on the damage prediction for the area of interest and different resource allocations;
determining, with the electronic processor, a feasible range of an availability of resources and determining the restoration time estimate further based on the feasible range of the availability of resources, and
transmitting, with the electronic processor, a damage assessment report for display on a user device, wherein the damage assessment report includes the restoration time estimate.

13. The method of claim 12, wherein determining the damage prediction for the area of interest includes determining a damage prediction representing a damage occurrence probability distribution that describes a probability of different amounts of damage.

14. The method of claim 12, further comprising:
developing the restoration time model with machine learning using training data, the training data including historical damage prediction data for an area of interest and associated historical restoration time data.

15. The method of claim 12, wherein determining the damage prediction for the area of interest includes
accessing environmental data associated with the area of interest;
accessing infrastructural data associated with the area of interest; and
determining the damage prediction based on the environmental data and the infrastructural data.

16. A non-transitory, computer-readable medium including instructions that, when executed by an electronic processor, cause the electronic processor to execute a set of functions, the set of functions comprising:
receiving weather data for an area of interest, wherein the weather data includes a weather observation for a weather event;
determining a damage prediction for the area of interest using a damage prediction model developed with machine learning using training data, the training data including historical weather data for the area of interest and associated damage;
determining a restoration time estimate based on the damage prediction for the area of interest and different resource allocations;
determining a feasible range of an availability of resources and determining the restoration time estimate further based on the feasible range of the availability of resources,
transmitting a damage assessment report for display on a user device, wherein the damage assessment report includes the restoration time estimate;
receiving actual damage data for the area of interest;
determining a new restoration time estimate based on the actual damage data for the area of interest; and
transmitting a subsequent damage assessment report for display on the user device, wherein the subsequent damage assessment report includes the new restoration time estimate.

17. The computer-readable medium of claim 16, wherein the set of functions further includes:
updating the damage prediction model based on the actual damage data.

18. The computer-readable medium of claim 16, wherein determining the damage prediction for the area of interest includes determining a damage prediction representing a damage occurrence probability distribution that describes a probability of different amounts of damage.

19. The computer-readable medium of claim 16, wherein receiving the actual damage data for the area of interest includes receiving an onsite damage assessment for the area of interest.

* * * * *